United States Patent
Ziebold et al.

(10) Patent No.: US 7,416,576 B2
(45) Date of Patent: Aug. 26, 2008

(54) FIBER BED ASSEMBLY AND FIBER BED THEREFOR

(75) Inventors: Steven A. Ziebold, Waterloo, IL (US); Douglas E. Azwell, Maryland Heights, MO (US); Frederick L. Mueller, Herculaneum, MO (US)

(73) Assignee: MECS, Inc., Chesterfield, MO (US)

( * ) Notice: Subject to any disclaimer, the term of this patent is extended or adjusted under 35 U.S.C. 154(b) by 95 days.

(21) Appl. No.: 11/342,136

(22) Filed: Jan. 27, 2006

(65) Prior Publication Data
US 2007/0175191 A1 Aug. 2, 2007

(51) Int. Cl.
*B01D 46/00* (2006.01)
*B01D 50/00* (2006.01)

(52) U.S. Cl. .............. 55/486; 55/423; 55/424; 55/426; 55/487; 55/489; 55/498

(58) Field of Classification Search .......... 55/318, 55/320, 321, 322, 323, 325, 329, 330, 413, 55/423, 424, 426, 486, 487, 488, 489, 498; 95/286, 287
See application file for complete search history.

(56) References Cited

U.S. PATENT DOCUMENTS

| | | | |
|---|---|---|---|
| 2,569,367 A | | 9/1951 | Bradner et al. |
| 3,085,381 A | * | 4/1963 | Sobeck .............. 55/323 |
| 3,093,469 A | | 6/1963 | Woolston et al. |
| 3,477,211 A | | 11/1969 | Pietsch |
| 3,527,027 A | * | 9/1970 | Knight et al. ........... 96/134 |
| 3,802,160 A | * | 4/1974 | Foltz .............. 95/273 |
| 4,048,075 A | | 9/1977 | Colvin et al. |
| 4,050,237 A | | 9/1977 | Pall et al. |
| 4,053,290 A | | 10/1977 | Chen et al. |
| 4,086,070 A | | 4/1978 | Argo et al. |
| 4,233,042 A | * | 11/1980 | Tao .............. 55/482 |
| 4,234,323 A | * | 11/1980 | Maher ............ 95/278 |
| 4,249,918 A | | 2/1981 | Argo et al. |
| 4,267,626 A | | 5/1981 | Terry |
| 4,443,233 A | | 4/1984 | Moran |

(Continued)

FOREIGN PATENT DOCUMENTS

AU 776507 B2 6/2000

(Continued)

OTHER PUBLICATIONS

Agranovski et al., Filtration of Liquid Aerosols on Wettable Fibrous Filters, AIChE Journal, Dec. 1998, vol. 44, No. 12.

(Continued)

*Primary Examiner*—Duane Smith
*Assistant Examiner*—Robert A Clemente
(74) *Attorney, Agent, or Firm*—Senniger Powers LLP

(57) ABSTRACT

A fiber bed assembly for a mist eliminator that operates at high efficiency and inhibits re-entrained liquid from leaving the mist eliminator. The fiber bed assembly has a construction that facilitates rapid drainage of liquid collected by the fiber bed. A pre-filter media can be employed upstream of the primary collection media to remove larger liquid drops. The pre-filter media can be used in unique combination with other features to reduce liquid re-entrainment, and/or allow increased flow capacity.

72 Claims, 6 Drawing Sheets

U.S. PATENT DOCUMENTS

| | | | |
|---|---|---|---|
| 4,564,377 A | | 1/1986 | Kocatas |
| 4,676,807 A | * | 6/1987 | Miller et al. .................. 95/285 |
| 4,759,782 A | * | 7/1988 | Miller et al. .................. 55/487 |
| 4,818,257 A | | 4/1989 | Kennedy et al. |
| 4,877,527 A | * | 10/1989 | Brownell .................... 210/489 |
| 4,878,929 A | * | 11/1989 | Tofsland et al. ............... 55/486 |
| 4,915,714 A | | 4/1990 | Teague et al. |
| 4,948,398 A | * | 8/1990 | Thomaides et al. ........... 95/286 |
| 4,976,759 A | * | 12/1990 | Foltz .......................... 55/487 |
| 5,039,413 A | | 8/1991 | Harwood et al. |
| 5,045,094 A | | 9/1991 | Paranjpe |
| 5,409,515 A | | 4/1995 | Yamamoto et al. |
| 5,415,676 A | * | 5/1995 | Tokar et al. .................. 55/318 |
| 5,454,858 A | * | 10/1995 | Tokar et al. .................. 95/285 |
| 5,543,047 A | | 8/1996 | Stoyell et al. |
| 5,605,748 A | | 2/1997 | Kennedy et al. |
| 5,639,370 A | * | 6/1997 | Fall et al. .................... 210/489 |
| 5,660,607 A | * | 8/1997 | Jokschas et al. ............ 55/350.1 |
| 5,690,765 A | | 11/1997 | Stoyell et al. |
| 5,725,784 A | | 3/1998 | Geibel et al. |
| 5,800,584 A | * | 9/1998 | Hinderer et al. ............... 55/482 |
| 5,871,557 A | * | 2/1999 | Tokar et al. .................. 55/472 |
| 5,876,601 A | | 3/1999 | Geibel et al. |
| 5,935,284 A | * | 8/1999 | Tokar et al. .................. 55/485 |
| 5,961,678 A | * | 10/1999 | Pruette et al. ................ 55/485 |
| 6,007,608 A | * | 12/1999 | Johnson ....................... 95/287 |
| 6,113,784 A | | 9/2000 | Stoyell et al. |
| 6,171,684 B1 | | 1/2001 | Kahlbaugh et al. |
| 6,702,941 B1 | * | 3/2004 | Haq et al. .................... 210/315 |
| 6,858,051 B2 | * | 2/2005 | Uhlenbrock .................. 55/321 |
| 6,932,907 B2 | * | 8/2005 | Haq et al. ................. 210/433.1 |
| 7,115,150 B2 | * | 10/2006 | Johnson et al. ............... 55/486 |
| 2001/0037982 A1 | | 11/2001 | Pulek et al. |
| 2004/0004110 A1 | | 1/2004 | Blackburne, Jr. |
| 2004/0040272 A1 | * | 3/2004 | Uhlenbrock .................. 55/423 |
| 2004/0162203 A1 | | 8/2004 | Stoyell et al. |
| 2006/0150594 A1 | | 7/2006 | Ziebold et al. |
| 2007/0137156 A1 | * | 6/2007 | da Costa et al. ............... 55/486 |

FOREIGN PATENT DOCUMENTS

| | | |
|---|---|---|
| DE | 331324 A1 | 10/1984 |
| DE | 19508815 A1 | 9/1996 |
| DE | 19540876 A1 | 5/1997 |
| EP | 0612551 A2 | 8/1994 |
| EP | 1010451 A1 | 6/2000 |
| GB | 1271867 | 4/1972 |
| JP | 2004-290858 | 10/2004 |
| WO | 03/028851 A1 | 4/2003 |
| WO | 03103798 A1 | 12/2003 |
| WO | 2006074383 A2 | 7/2006 |

OTHER PUBLICATIONS

Monsanto Enviro-Chem Systems, Inc., Brink® Mist Eliminators, 1990, 12 pgs.

International Search Report for PCT/US2007/060780, European Patent Office, Oct. 24, 2007, 6 pages.

* cited by examiner

FIBER BED ASSEMBLY AND FIBER BED THEREFOR

FIELD OF THE INVENTION

The present invention generally relates to an improved fiber bed assembly for the separation of liquid particulates (with or without solids dissolved or suspended therein) from gas streams. More particularly, it relates to a fiber bed assembly having an improved capability for inhibiting re-entrainment of collected liquid.

BACKGROUND OF THE INVENTION

Mist eliminators have found widespread use in applications wherein aerosols, particularly of less than 3 microns, must be separated from a gas or vapor (hereinafter and in the claims collectively referred to as "gas") stream. These mist eliminators include fiber beds through which the gas stream is passed to achieve separation. Some of the more frequent applications of mist eliminators include removal of acid mists, such as sulfuric acid mist, in acid manufacturing processes, plasticizer mists in, for example, polyvinyl chloride floor or wall covering manufacture, water soluble solid aerosols such as, for example, emissions from ammonium nitrate prill towers. In removal of wetted soluble solid aerosols, the collected solid particulates are dissolved in, or flushed away by, a liquid within the fiber bed through use of an irrigated fiber bed or of a fogging spray of liquid such as water injected into the gas stream prior to the fiber bed.

Re-entrainment of collected liquid from the downstream surface of the fiber bed often causes problems. These problems can include any of the following individually or in combination; fouling of downstream process equipment, degradation of product purity, corrosion to ductwork and in some cases difficulty in achieving emission requirements. Re-entrainment in fiber bed separators can arise from two mechanisms. As the liquid drains down through the fiber bed and/or the downstream surface thereof, the moving gas stream can cause some of the draining liquid to break or bubble out of the descending liquid stream and become re-entrained in the gas stream as droplets. This problem is particularly severe at the bottom of a vertically disposed fiber bed since all of the liquid collected by the fiber bed necessarily drains to the bottom and from a practical standpoint because of gas phase drag on the liquid, out the downstream surface at the bottom of the fiber bed. At this disengagement point where the greatest cumulative drainage occurs, gas phase drag can cause bubbling, "spitting", jetting or fragmentation of the draining liquid. As these bubbles break, large to sub-micron sized fragments or droplets are formed which are carried away by the moving gas stream as what is termed "bubble re-entrainment".

The second re-entrainment mechanism termed "bed re-entrainment" occurs at gas bed velocities so high that gas phase drag on the draining liquid in the entire fiber bed on downstream discharge surfaces of the fiber bed causes bubbling, spitting, jetting and fragmentation into re-entrainment. Thus, in a given fiber bed and at a constant liquid loading, as bed velocity increases, a point is reached where bubble re-entrainment begins. This first occurs at the bottom of the fiber bed on the gas discharge surface of the collecting media. As the bed velocity is increased even further re-entrainment begins to occur at higher levels on the fiber bed until with only minor increases in velocity, re-entrainment is occurring from substantially the entire gas discharge surface of the fiber bed. This is typically referred to as a totally flooded condition.

Prior attempts have been made to prevent re-entrainment and to operate the fiber bed in a drier condition by removing collected liquid and soluble solids from the fiber bed. In one example a tubular fiber bed is formed of two or more shorter sections that are stacked one on top of the other to form the fiber bed. A metal plate is placed between adjacent sections in the stack to form a barrier against migration of liquid from one section into the next lower section and to cause liquid to flow radially away from the sections (and out of the fiber bed). However in this arrangement, it is possible for the liquid to move out of the fiber bed to the discharge (i.e., downstream) face of the fiber bed. At this location, the chances of the liquid becoming re-entrained increase. In addition, it is difficult to maintain the necessary gas seal between the fiber bed sections and the metal plate to avoid gas bypassing between the section and the adjoining plate.

SUMMARY OF THE INVENTION

In one aspect of the invention, a fiber bed assembly for a fiber bed mist eliminator used to remove aerosols and/or wetted soluble solids from a moving gas stream generally comprises a fiber bed support having a wall defining an upstream space and a downstream space. The wall includes openings therein to permit the gas stream to move generally freely through the wall from the upstream space to the downstream space. A fiber bed is supported by the fiber bed support and generally covers the wall openings so that the gas stream passes through the fiber bed moving from the upstream space to the downstream space. The fiber bed comprises collecting fiber media and drainage media located on a downstream side of the fiber media. The drainage media comprises channel strips along the height of the fiber bed that are arranged to define overlapping regions in which one of the channel strips overlaps an adjacent one of the channel strips.

In another aspect of the present invention, a fiber bed assembly generally comprises a fiber bed support generally as set forth in the preceding paragraph. A fiber bed is supported by the fiber bed support and generally covers the wall openings so that the gas stream passes through the fiber bed moving from the upstream space to the downstream space. The fiber bed comprises a collecting fiber media and a pre-filter media on an upstream side of the collecting fiber media. The pre-filter media includes a layer of collecting fiber media and drainage media disposed generally between the collecting fiber media and the collecting fiber layer.

In yet another aspect of the present invention, a fiber bed assembly generally comprises a fiber bed support generally as set forth in the preceding paragraph. A fiber bed is supported by the fiber bed support and generally covers the wall openings so that the gas stream passes through the fiber bed moving from the upstream space to the downstream space. The fiber bed comprises collecting fiber media and drainage media located on a downstream side of the collecting fiber media. The fiber bed is generally tubular in shape and has upper and lower ends. The downstream space is at least partially located in an interior of the tubular fiber bed. A re-entrained liquid collection member is located at least partially in the downstream space on the interior of the tubular fiber bed.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
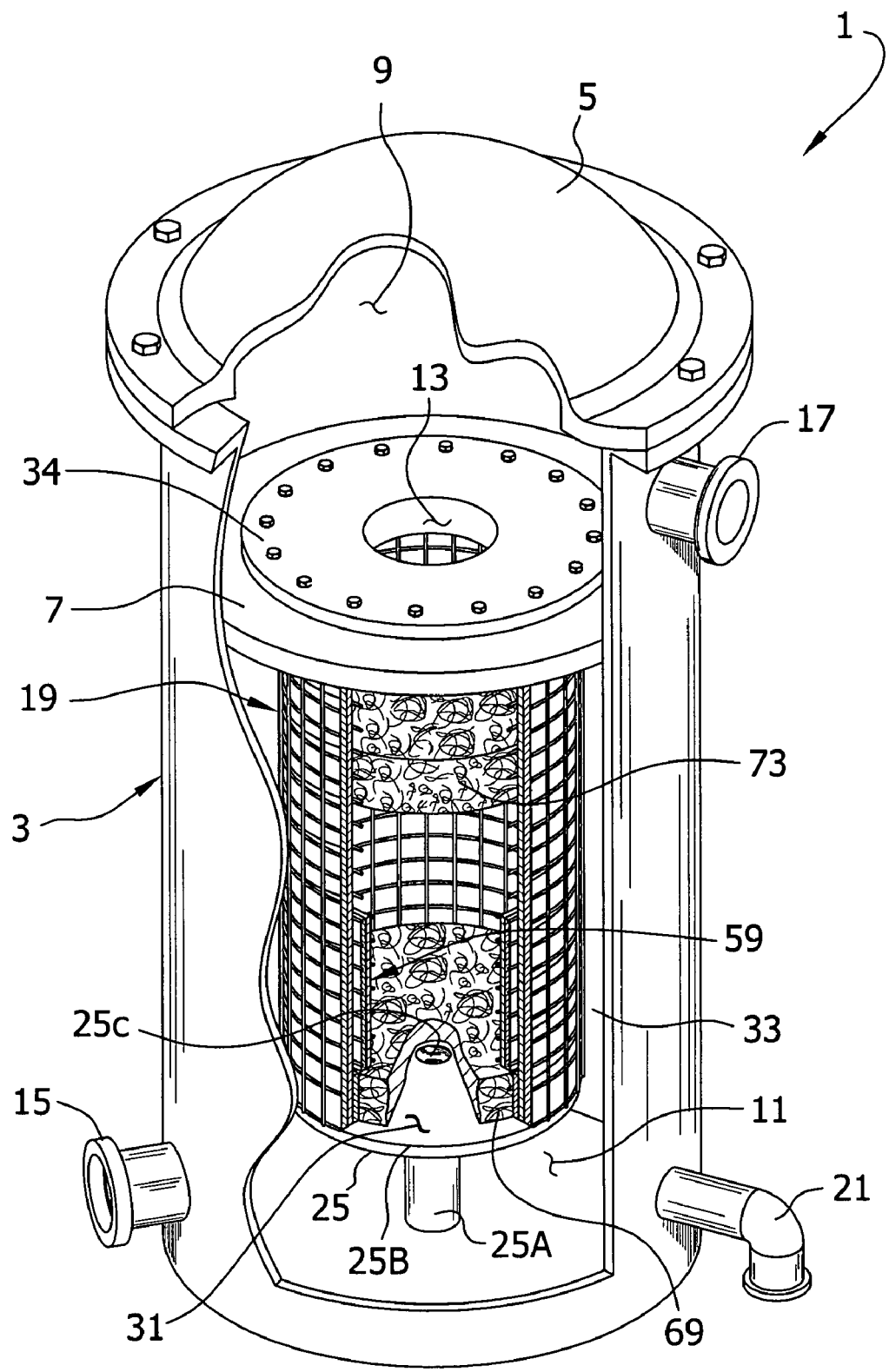
FIG. 1 is a perspective of a mist eliminator with a portion of a tank thereof broken away to show a fiber bed assembly of the mist eliminator constructed according to the principles of the present invention.

Referring now to the drawings and in particular to FIG. 1, a mist eliminator (indicated generally at 1) can be placed in the flow line of a stream of gas to remove aerosols and/or wetted soluble solids from the stream of gas. The mist eliminator is of the type that has particular application for use in gas streams having a liquid aerosol content (especially, but not limited to, where there are liquid aerosol particles having submicron sizes) to be removed from the gas stream. The mist eliminator 1 includes a tank (generally indicated at 3) having a removable lid 5 sealingly attached to the tank to close an open top of the tank. An annular mounting plate 7 within the tank 3 divides the tank into an upper chamber 9 and a lower chamber 11. The gas stream may pass from the lower chamber 11 to the upper chamber 9 only through a center hole 13 of the annular mounting plate 7. The tank 3 includes a gas stream inlet 15 for receiving a stream of gas ladened with aerosol and/or wetted soluble solids into the lower chamber 11 of the tank, and a filtered, clean gas stream outlet 17 in fluid communication with the upper chamber 9 in the tank to permit filtered, clean gas to pass out of the mist eliminator 1 to an exhaust or other processing equipment (not shown).

A fiber bed assembly, indicated generally at 19, is located in the lower chamber 11 of the tank 3 and has a generally tubular shape with a closed bottom and an open top. The filter bed assembly 19 is sealingly mounted on the mounting plate 7 so that an open top of the filter bed assembly is in registration with the center hole 13 of the mounting plate. Gas cannot flow from the lower chamber 11 to the upper chamber 9 unless it passes through the fiber bed assembly 19. The mounting plate 7 supports the filter bed assembly 19 within the tank 3 so that the filter bed assembly hangs down from the mounting plate. The fiber bed assembly 19 removes a very high percentage of the aerosol and/or wetted soluble solids from the gas stream, which is drained to the bottom of the tank 3. An external drain pipe 21 near the bottom of the tank 3 drains off liquids and/or wetted soluble and dissolved solids that are collected in the bottom of the tank.

The illustrated mist eliminator 1 of FIG. 1 is a forward flow or "hanging style" mist eliminator. It is also known to have mist eliminators of other constructions, such as a reverse flow or "standing" mist eliminator where gas flows from the inside central core of the element to the outside, or a flat bed mist eliminator (not shown). Still further, concentric fiber bed assemblies having concentric forward and reverse flow fiber beds may be used. The present invention has application to various forms of mist eliminators, including all of the aforementioned mist eliminators.

Figure 2:
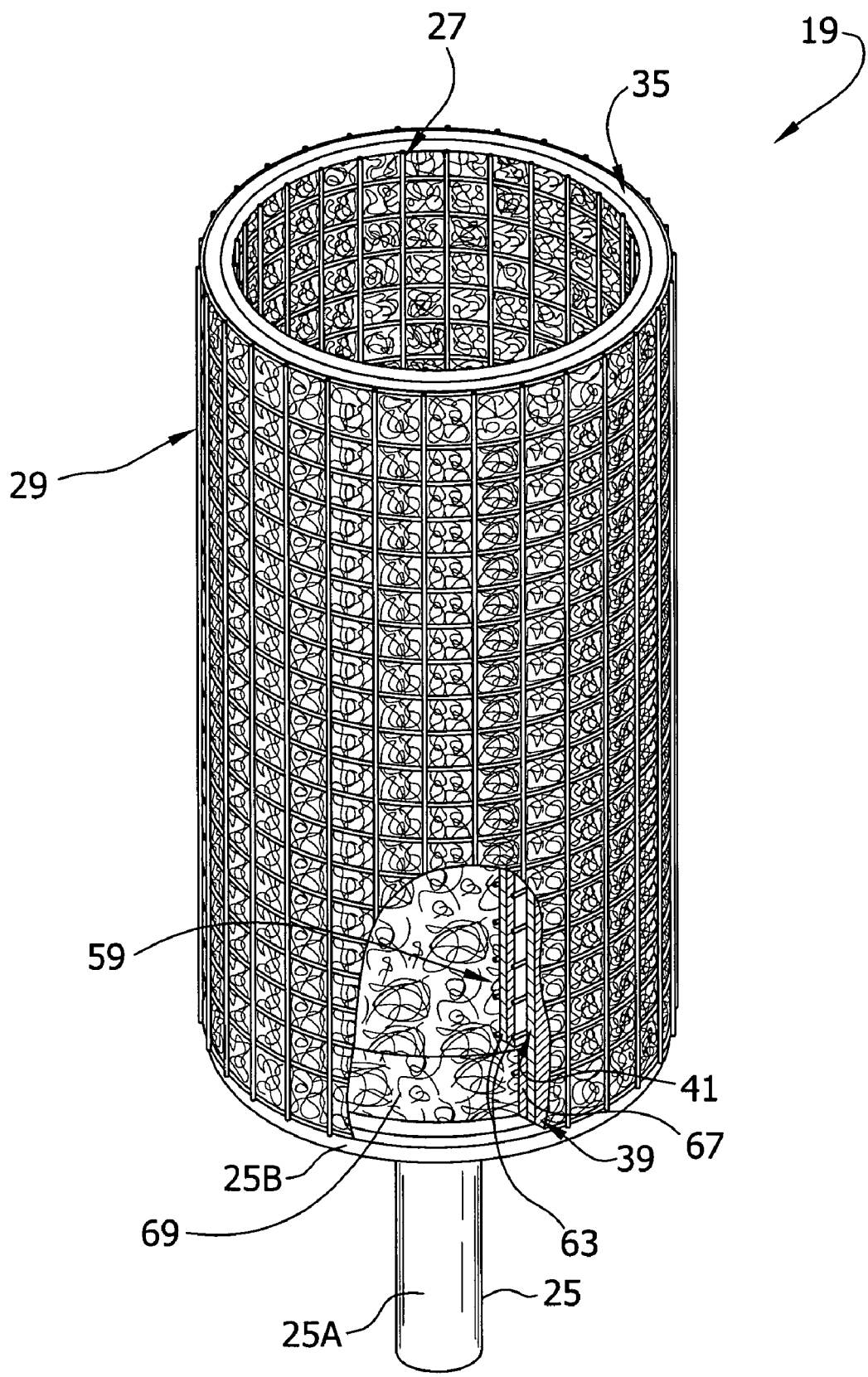
FIG. 2 is an enlarged perspective of the fiber bed assembly partially broken away to show internal construction.

Referring now also to FIG. 2, fiber bed assembly 19 of the forward flow mist eliminator 1 includes a drain leg 25 that is spaced above the bottom of the tank 3. The drain leg 25 comprises a drain tube 25A, a circular bottom plate 25B, and a passage 25C extending through the drain tube and opening at the bottom plate. The passage 25C opens into the tank 3 for draining collected liquids and particles removed from the gas stream by the fiber bed assembly 19. The liquid and wetted or dissolved soluble solids collected in the bottom of the tank 3 are drained through drain pipe 21. A liquid level in the bottom of tank 3 provides a gas seal to allow collected liquid in the fiber bed assembly 19 to drain through drain tube 25A to the bottom of tank.

An inner screen and an outer screen (generally indicated at 27 and 29, respectively) extend up from the bottom plate 25B to the mounting plate 7 and are concentrically arranged in radially spaced relation. Collectively, the inner and outer screens 27, 29 constitute a wall in the illustrated embodiment that separates a core interior (downstream) space 31 within the inner screen 27 from an exterior (upstream) space 33 within the tank 3 but outside the inner screen 27. It will be understood that the wall may be constructed in other ways (e.g., having only a single screen or no screen) without departing from the scope of the present invention. The inner and outer screens 27, 29 are of a generally mesh construction so that they each define relatively large openings that would permit the gas stream to move generally freely though the inner and outer screens between the core interior space 31 and the exterior space 33. The screens 27, 29 are connected to an annular flange 34 which is disposed on the top side of the annular mounting plate 7. The annular flange 34 is attached to the mounting plate 7 and supports the screens 27, 29 and drain leg 25. In the illustrated embodiment, the inner screen 27, outer screen 29 and annular flange 34 comprise a fiber bed support. It is to be understood that other constructions for supporting a fiber bed may be used without departing from the scope of the present invention.

A fiber bed (generally indicated at 35) of the fiber bed assembly 19 is located in the radial space between the inner and outer screens 27, 29 and substantially fills the space and covers the openings in the screens so that the gas stream must pass through the fiber bed to move from the exterior space 33 surrounding the fiber bed assembly to the core interior space 31 within the fiber bed assembly (see FIG. 1). The fiber bed 35 is generally tubular in shape and operatively sealed at opposite ends to the mounting plate 7 and to the bottom plate 25B of the drain leg 25 in a way known to those of ordinary skill in the art so that gas does not bypass the fiber bed in flowing from the exterior space 33 in the tank 3 to the core interior space 31.

Figure 3:
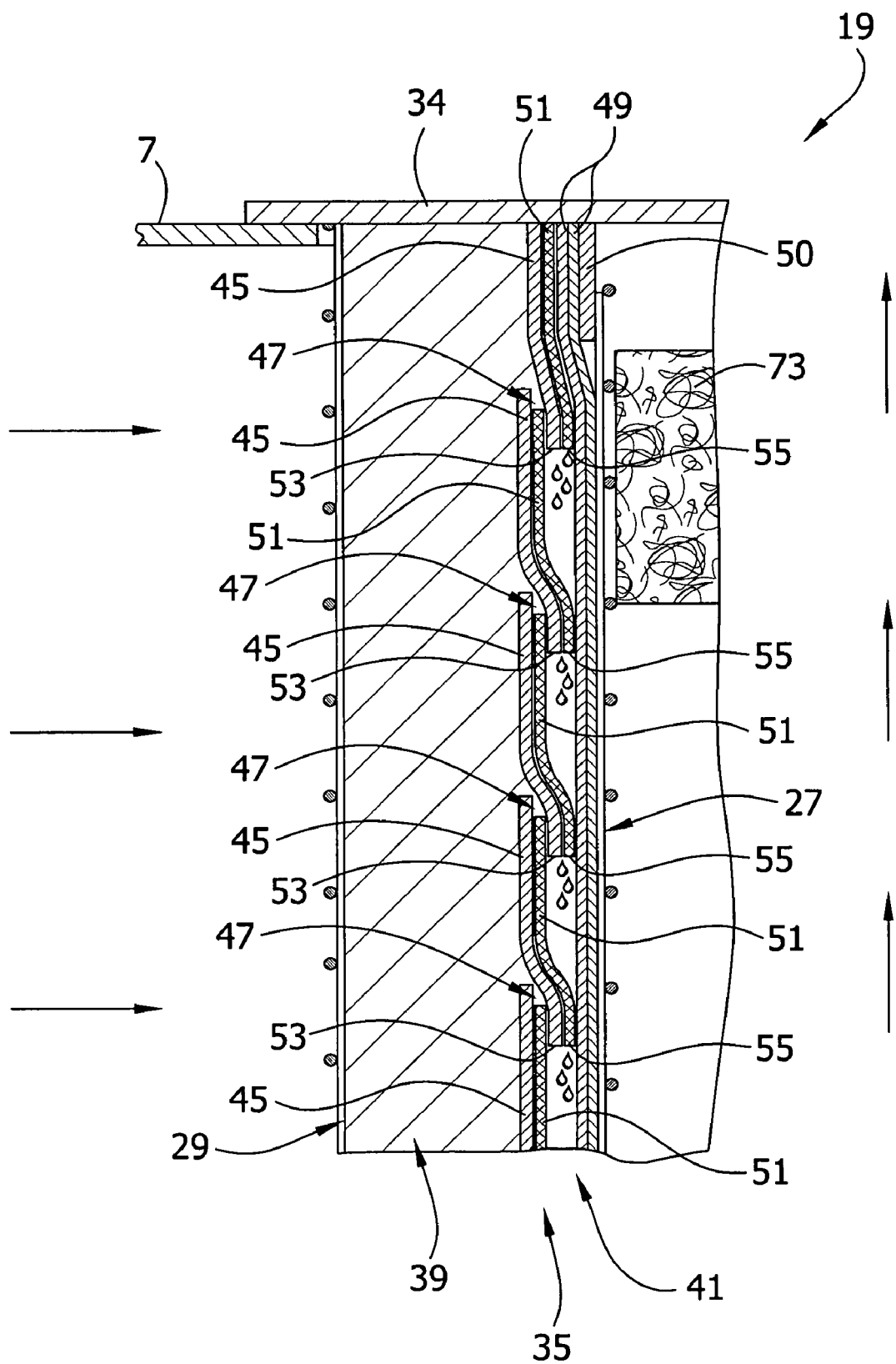
FIG. 3 is an enlarged, fragmentary, schematic vertical section of the mist eliminator of FIG. 1 taken at the top of the fiber bed assembly.
Figure 4:
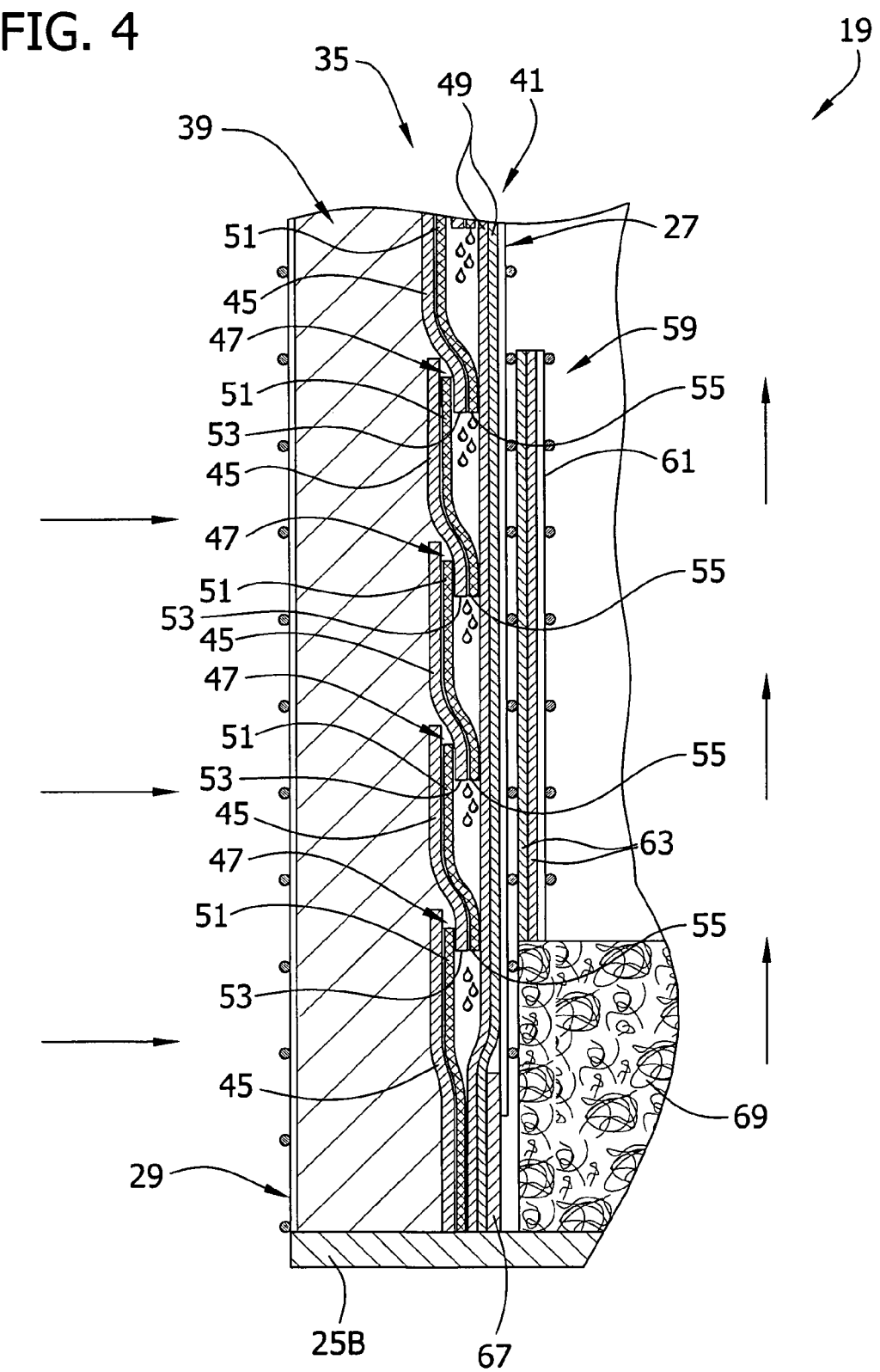
FIG. 4 is an enlarged, fragmentary, schematic section similar to FIG. 3, but taken at the bottom of the fiber bed assembly.

Referring now to FIGS. 3 and 4, the fiber bed 35 is shown to include collecting fiber media 39 and drainage fiber media 41 (both reference numerals indicating their subjects generally). The collecting fiber media 39 is formed of a suitable material such as a non-matting bed of randomly distributed fibers having a mean diameter of about 0.5-15 microns packed to a substantially uniform bed voidage of from about 85 to 98 percent. The random fibers would be supported by an additional wire screen (not shown). As another example, the collecting fiber media 39 can be a needle-punched mat made of fibers having a mean diameter of about 0.5-15 microns formed to a substantially uniform bed voidage of from about 85 to 98 percent, which eliminates the requirement for additional screen support. The drawings illustrate the collecting fiber media 39 as such a needle-punched mat extending substantially the full height of the fiber bed assembly 19. The collecting fiber media 39 could be formed of multiple such mats (not shown). Bulk fiber can be packed between opposing supports 27, 29 to form a collecting fiber media. Still further, a collecting fiber media could also have a wrapped construction of the type shown in co-assigned U.S. application Ser. No. 11/031,820, filed Jan. 7, 2005, the disclosure of which is incorporated herein by reference. For simplicity of illustration, the collecting fiber media 39 is shown as a single mat.

The arrows in FIGS. 3 and 4 indicate the direction of flow of the gas stream through the fiber bed assembly 19. FIGS. 3 and 4 illustrate the sections schematically to show the composition of the fiber bed 35. Gaps shown between the fiber bed 35 and inner screen 27 and gaps between other components of the fiber bed would not be present in actual construction of the fiber bed. However, they appear for ease and clarity of illustrating distinct components and pathways of collected liquid. For purposes of this description references to "downstream side" and "upstream side" indicate a general relative location of components based on the normal direction of gas stream flow through the fiber bed assembly 19. They do not require that the components be in contact with each other or even immediately adjacent to each other (i.e., there may be intervening structure).

The drainage media 41 comprises channel strips 45 arranged along the height of the fiber bed 35. The channel strips 45 include header channel strips at the top and bottom of the fiber bed 35 that are annular in shape, extending around the fiber bed. Between the headers the channel strips 45 can be formed by winding a single length of material in a spiral around the inner screen 27. Other arrangements are possible within the scope of the present invention. For example and without limitation, multiple lengths of material could be used to form the spiral wrap, or each drain strip could be a separate, circumferentially wound piece of material. For purposes of the present description, each turn of the spiral winding is considered a "channel strip". Still further, each "strip" could be formed by multiple layers of material (not shown). In the illustrated embodiment, all of the channel strips 45 are arranged to define overlapping regions (generally indicated at 47) in which one of the channel strips overlaps an adjacent one of the channel strips. One type of material suitable for the channel strips would be, for example, a thin needle-punched fiber mat having fibers with a mean diameter of about 3-20 microns formed to a substantially uniform bed voidage of from about 85 to 98 percent. The mean fiber diameter and the bed voidage are preferably selected so that at design gas velocity and aerosol loading, the media will not flood with the collected liquid phase and the residual saturation of the media against gas phase drag of the liquid phase $R_v$ is less than the residual saturation against gravity drainage of the liquid phase ($R_g$). Residual saturation against gas phase drag ($R_v$) is a measure of a characteristic of the media to retain liquid (and/or soluble solids) within the media when gas is flowing through the media at design specification that tends to push liquid out of the media in the direction of gas flow. Residual saturation against gravity flow ($R_g$) is a measure of a tendency of the media to retain liquid (and/or soluble solids) against the force of gravity. These residual saturation characteristics and methods of determining them are disclosed in U.S. Pat. No. 4,086,070, the disclosure of which is incorporated herein by reference.

The drainage media 41 has additional components located generally on the downstream side of the channel strips 45. In the illustrated embodiment, the drainage media includes multiple full length drainage layers 49 or mats lying in generally superposed relation with each other and extending the full height of the fiber bed 35. It will be understood that other configurations of the drainage layers 49 are possible, including having no drainage layers, any number of such layers (including only a single layer), or having the drainage layers individually extending less than the full height of the fiber bed 35. An annular veil 50 projects down from the flange 34 and facilitates sealing with the fiber bed 35 at the top to inhibit gas bypassing the filter bed. The inner screen 27 is attached to the veil 50 as by welding. The drainage media 41 still further includes drain strips 51. Portions of the drain strips 51 are disposed in the overlapping regions 47 defined by the channel strips 45 and are interposed between the adjacent, overlapped channel strips in the overlapping regions. The material of the drain strips 51 could be, for example, a chemically bound fiber mat of fibers having a mean diameter of about 20-35 microns formed to a substantially uniform bed voidage of from about 85 to 99 percent. The mean fiber diameter and the bed voidage are preferably selected so that the residual saturation of the media against gas phase drag of the liquid phase is greater than the residual saturation against gravity drainage of the liquid phase (i.e., $R_g < R_v$). The drainage layers 49 could be made of the same or different drainage material as drain strips 51.

The drain strips 51 may be formed by spirally wrapping onto the inner screen 27 at the same time the channel strips 45 are wrapped. In that case, each turn of the spiral defines one of the drain strips 51. Other ways of forming the drain strips 51 may be used without departing from the scope of the present invention. Although the drain strips 51 are illustrated as having a height only somewhat greater than the channel strips 45, one or more of the drain strips could extend from where it emerges from a respective overlapping region 47 all the way to the bottom of the fiber bed 35.

As a result of this construction, a lower end 53 of each of the channel strips 45 is arranged over a portion of one of the drain strips 51 so that liquid draining out of the channel strip passes directly onto the drain strip. Similarly, the lower end 55 of each drain strip 51 is generally over a portion of the next lower drain strip. Liquid can drip out of each drain strip 51 either to the adjacent drainage layers 49 on the downstream side of the drain strips, or by exiting the drain strip at its lower end 55 to the next drain strip. This construction helps to inhibit liquid build up in the channel strips 45. As a result, the collecting fiber media 39 operates with less liquid in the interstitial void space within the collecting fiber media. Among the benefits of this embodiment of the invention is a reduction in re-entrainment of liquid and/or soluble solids captured by the fiber bed 35. This is achieved with a relatively small pressure drop through the mist fiber bed assembly 19. Moreover, efficiency in the collection of submicron particles is improved because the collecting fiber media 39 operates drier.

Referring to FIG. 4, the fiber bed assembly 19 further comprises an additional drainage insert indicated generally at 59. The drainage insert is located near the bottom of the fiber bed 35 and extends to a height that is about one third of the way up the fiber bed. In this embodiment, the top of the drainage insert 59 might be located about one third to one half of the way up the height of the fiber bed 35. The height and positioning of the drainage insert may be other than described within the scope of the present invention. The drainage insert 59 includes a support screen 61 and two mats 63 of drainage material. It is to be understood that one mat 63 or more than two mats may be used within the scope of the present invention. The drainage material of the mats 63 could be, for example, a chemically bound fiber mat of fibers having a mean diameter of about 20-35 microns formed to a substantially uniform bed voidage of from about 85 to 99 percent. The mean fiber diameter and the bed voidage are preferably selected so that the residual saturation of the media against gas phase drag of the liquid phase is greater than the residual saturation against gravity drainage of the liquid phase (i.e., $R_g < R_v$). The support screen 61 is generally of the same construction as the inner and outer screens 27, 29, except that it is shorter in height. The number of mats used may be other than two within the scope of the present invention. The drainage insert 59 provides substantial additional drainage capacity near the bottom of the fiber bed 35 where it is needed to handle the higher liquid flux from the liquid that drains from higher above in the fiber bed and collects in a lower portion of the fiber bed. Another advantage of the drainage insert 59 is realized if the lower portion of the collecting fiber media 39 of the fiber bed 35 includes areas of low packing density. In that case, the drainage insert 59 will help to reduce local re-entrainment caused by higher gas velocity flowing preferentially through areas of low packing density in the collecting media 39.

Still referring to FIG. 4, an annular veil 67 projects up from the bottom plate 25B on the downstream side of the drainage layers 49 next to the inner screen 27. The inner screen is attached to the veil 67 as by welding. The veil 67 is solid and blocks the flow of gas radially past the veil. A generally disk-shaped drain pad 69 located on the downstream side of the veil 67 extends up from the bottom plate 25B to a location above the top of the veil. For instance, the height of the drain pad 69 may be approximately twice that of the veil 67. In the illustrated embodiment, the drainage insert 59 rests on top of the drain pad 69. The drain pad is made of a suitable material such as a stainless steel wire mesh with a wire diameter of 0.011 inches with a density of 5 to 12 pounds per cubic foot. Liquid tends to accumulate within the fiber bed 35 and in the drainage media 41 near the bottom of the fiber bed. Under flooded conditions, the gas flow can push the liquid inward into the downstream core interior space 31, possibly causing re-entrainment in the gas stream. However, the drainage insert 59 and the drain pad 69 intercept this radial flow of liquid spilling over the top of the veil 67. As the liquid moves down within the drainage insert 59 and the drain pad 69 into registration with the veil 67, the liquid is shielded from the radial gas flow so that liquid is able to drain to the bottom of the drainage insert and drain pad without becoming re-entrained in the gas flow. A similar construction including a veil (or "baffle plate") is shown in U.S. Pat. No. 4,053,290, the disclosure of which is incorporated herein by reference.

As an additional guard against re-entrainment, a re-entrainment insert (broadly, "a re-entrainment liquid collection member"), which can be selected from a family of common impaction devices is located at least partially in the core interior space 31 of the fiber bed assembly 19. In the illustrated embodiment of FIGS. 1-4 the re-entrainment insert is a mesh pad 73. The mesh pad 73 is located about one third of the way down from the top of the fiber bed 35 and divides the core interior space 31 into upper and lower portions. Gas that passes through the fiber bed 35 into the interior space below or at the mesh pad 73 must pass through the mesh pad before passing through the center hole 13 into the upper chamber 9. In one embodiment the mesh pad is made of 11 mil wire and has a density of about 5 to 12 lbs/ft$^3$. The mesh pad 73 is about 3 to 6 inches thick in the illustrated embodiment. The mesh pad may be a plain mesh pad (as shown) or a co-knit mesh pad (not shown). Co-knit mesh pads have finer fibers knitted together with the primary wire mesh filaments. As used in the claims herein, "mesh pad" can be a plain pad, a co-knit mesh pad or another porous pad.

Preferably, the mesh pad 73 is located within the fiber bed assembly 19 at a location where the gas core velocity is in a range of about 400 to 700 feet per minute (fpm). A co-knit mesh pad (not shown) generally operates at lower core gas velocities. Other locations are possible, but location at places where gas velocities are lower than maximum (e.g., lower than about 700 fpm) provides for best operation of the mesh pad 73 to remove any liquid that may have otherwise been re-entrained in the gas steam after it passes through the fiber bed 35. The most likely region of the fiber bed 35 from which liquid may be re-entrained, is the lower part of the fiber bed. This is because liquid flows downward within the fiber bed 35 under the influence of gravity and tends to accumulate at the bottom. Liquid captured by the mesh pad 73 can migrate out of the insert into the drain pad 69 and thence out of the fiber bed assembly 19 through passage 25C. Preferably, the mesh pad 73 causes an additional pressure drop of less than one inch of water column. The slight increase in back pressure at the bottom of the fiber bed 35 desirably forces some additional amount of the gas stream to flow through an upper portion of the fiber bed that tends to remain drier in operation. Consequently, less overall re-entrainment occurs because there is less gas flow in a lower portion including the bottom of the fiber bed that is operating wetter, and more gas flow in the upper bed portion that operates drier.

Figure 6:
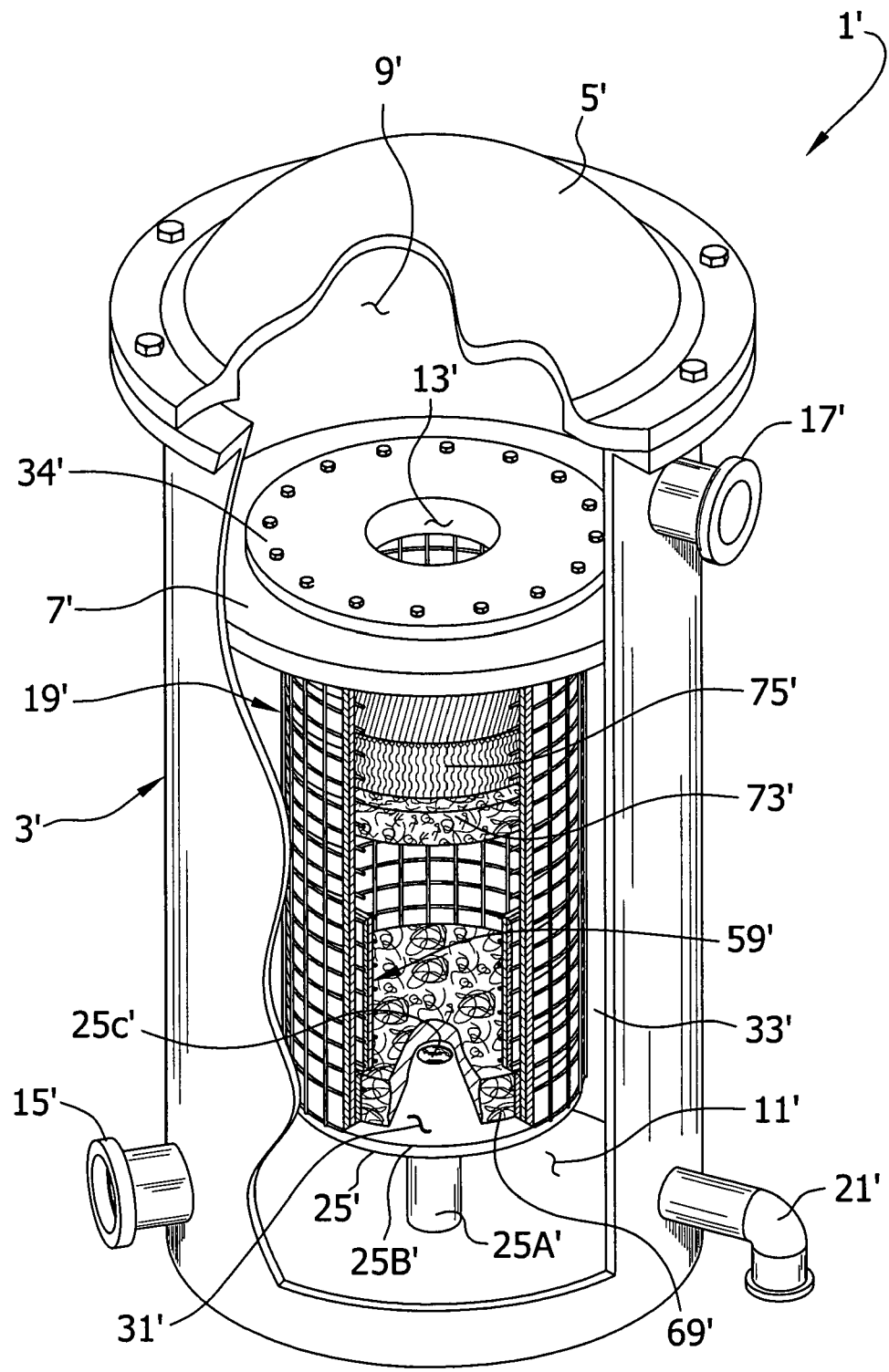
FIG. 6 is a perspective of a mist eliminator with a portion of a tank thereof broken away to show a fiber bed assembly of another configuration.

In addition to or instead of the mesh pad 73, the re-entrainment insert may include a chevron (or baffle plate device). FIG. 6 illustrates a mist eliminator 1' having substantially the same construction as mist eliminator 1 except that a chevron 75' is used in addition to a mesh pad 73'. Parts of the mist eliminator 1' corresponding to parts of the mist eliminator 1 will be given the same reference numeral with the addition of a trailing prime. The chevron 75' comprises a series of generally chevron-shaped baffle plates connected together by tying structure, and is generally disk shaped like the mesh pad. Other shapes for the chevron are possible within the scope of the present invention. The baffle plates may, for example, have a spacing in the range of 0.75 to 4 inches (19 to 102 mm). The chevron 75' is preferably positioned in the fiber bed core space 31' at a location where the gas core velocity is between about 900 to 1,500 fpm. In a typical case, the pressure drop across the chevron might be 0.1 to 2 inches of water column (2 to 50 mm of water column). The chevron 75' is spaced above the mesh pad 73' in the interior core space 31'. The combination of the mesh pad 73' and chevron 75' allows higher operating core gas velocities and provides for increased removal of smaller particles from the gas stream. It will be understood that the mesh pad 73' could be placed against the chevron 75' even though that may place the mesh pad out of its optimal core gas velocity operating range. In that case, the mesh pad 73' would act as a pre-filter or precoalescer for the chevron 75'.

Figure 5:
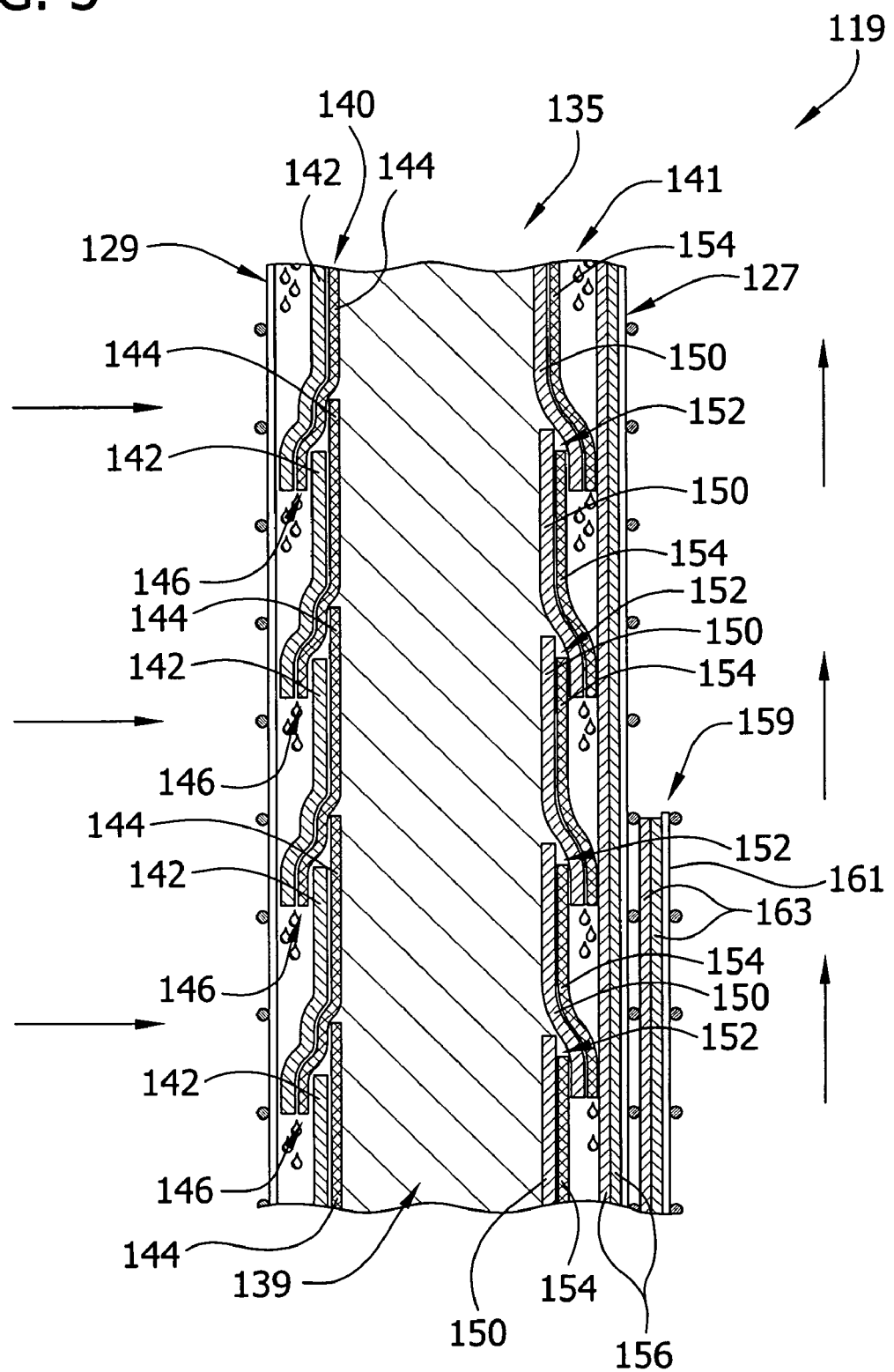
FIG. 5 is an enlarged, fragmentary, schematic section of a fiber bed assembly of another embodiment taken generally in the middle of the fiber bed assembly.

Referring now to FIG. 5, a fiber bed assembly 119 of a second embodiment of the present invention is shown to comprise a fiber bed support formed by an inner screen 127 and an outer screen 129, and a fiber bed 135 (all reference numerals indicating their subjects generally). Parts of the fiber bed assembly 119 of the second embodiment corresponding to those of the first embodiment will be given the same reference numerals, plus "100". The fiber bed 135 includes a collecting fiber media 139 that may be formed in substantially the same way as described for the fiber collecting media of the first embodiment and is illustrated as a single mat of fibrous material. The fiber bed 135 further includes a pre-filter media (indicated generally at 140) on an upstream side of the collecting fiber media 139 and a post-filter media (indicated generally at 141) on a downstream side of the collecting fiber media.

The pre-filter media 140 is preferably configured in the illustrated embodiment to remove larger particles from the gas stream (e.g., on the order of 1 micron or greater). Accordingly, larger particles never reach the primary collecting fiber media 139, keeping it drier. The pre-filter media 140 comprises collecting fiber strips 142 collectively forming a collecting fiber layer. The pre-filter media 140 further comprises drain strips 144 collectively forming a drainage layer. The collecting fiber strips 142 are made of a suitable material such as a needle-punched fiber mat having fibers with a mean diameter of about 3-20 microns formed to a substantially uniform bed voidage of from about 85 to 98 percent. The mean fiber diameter and the bed voidage are preferably selected so that at design gas velocity and aerosol loading the media will not flood with the collected liquid phase and the residual saturation of the collecting fiber strips 142 against gas phase drag of the liquid phase is less than the residual saturation against gravity drainage of the liquid phase (i.e., $R_v < R_g$). The collecting fiber material in the strips 142 removes droplets of liquid from the gas stream. The direction of flow of the gas stream is indicated by the arrows in FIG. 5. The drain strips 144 are made of a suitable material such as a chemically bound fiber mat of fibers having a mean diameter of about 20-35 microns formed to a substantially uniform bed voidage of from about 85 to 99 percent. The mean fiber diameter and the bed voidage are preferably selected so that the residual saturation of the media against gas phase drag of the liquid phase is greater than the residual saturation against gravity drainage of the liquid phase (i.e., $R_g < R_v$). The fiber bed assembly 119 shown in FIG. 5 is tubular like the fiber bed assembly 19 shown in FIGS. 1-4. However, the FIG. 5 construction also has application in other applications, such as a flat bed.

The collecting fiber strips 142 are arranged to define overlapping regions (generally indicated at 146) in which one of the collecting fiber material strips overlaps an adjacent one of the collecting fiber material strips. It will be understood that each "strip" can be formed by one or more layers of material. As schematically illustrated in FIG. 5, there is one layer in each strip 142. A lower portion of each drain strip 144 is disposed in a respective one of the overlapping regions 146 and is exposed to an upstream side of the fiber bed 135. The drainage layer could include other layers (not shown) besides the drain strips 144. These other layers could extend the full height of the fiber bed. In use, the collecting fiber strips 142 capture liquid and wetted soluble solids from the gas stream. The collecting fiber strips 142 are relatively thin in comparison to the collecting fiber media 139. The captured liquid tends to move substantially horizontally under influence of the gas flow within the collecting fiber strips 142; The liquid is transferred to the immediately downstream drain strip 144 in which the liquid moves downward because of gravity. Lower ends of the collecting fiber strips 142 and the drain strips 144 are exposed to the upstream side of the fiber bed 135 at the lower ends of respective overlapping regions 146. Coalesced liquid in the collecting fiber strips 142 and the drain strips 144 drips out on the upstream side of the fiber bed 135. Since large droplets dripping out of the media tend to be removed preferentially by gravity instead of being moved back into the media by gas forces, less liquid is present in the gas stream that enters the primary collecting fiber media 139, keeping it dryer in operation. As a general rule, liquids and soluble solids in a gas stream are less likely to be re-entrained when passed through a fiber bed filter operating closer to dry state (less wetted filter).

The post-filter drain media 141 also helps to keep the collecting fiber media 139 drier by promoting good drainage from the collecting fiber media. The post filter media 141 includes post-filter collecting fiber channel strips 150 that are thin relative to the primary collecting fiber media 139. The post-filter collecting fiber channel strips 150 may, for example, be formed of the same material as the pre-filter collecting fiber strips 142. It will be understood that the pre-filter collecting fiber strips 142 and post-filter collecting fiber strips may be made out of different materials. Although each collecting fiber channel strip 150 is shown as having only a single layer, each strip may include multiple layers of material. A lower edge margin of each collecting fiber channel strip 150 overlaps an adjacent post-filter collecting fiber strip forming an overlapping region 152. The post-filter media 141 further includes post-filter drain strips 154 generally disposed on a downstream side of the post-filter collecting fiber channel strips 150. The post-filter drain strips 154 are made of a suitable material such as the same material out of which the pre-filter drain strips 144 are made. It will be understood that the pre-filter drain strips 144 and the post-filter drain strips 154 may be made out of different materials. The post-filter drain strips 154 are shown as comprising a single layer, but more than one layer could be employed within the scope of the present invention. Upper edge margins of the post-filter drain strips 154 extend into the overlapping regions 152 formed by adjacent post-filter collecting fiber channel strips 150. Lower ends of the collecting fiber channel strips 150 and the drain strips 154 are located downstream of the collecting fiber media 139. Additional post-filter drain layers 156, each extending the full height of the fiber bed 135, are located downstream from the post-filter drain strips 154. However, these additional post-filter drain layers 156 could be omitted without departing from the scope of the present invention.

In use, the post-filter collecting fiber material strips help to direct liquid from the discharge surface of the primary collecting fiber media 139. This is because the $R_v$ for the post-filter collecting fiber material channel strips 150 is the same order of magnitude as the $R_v$ for the primary collecting fiber 139 and that for both channel strips 150 and primary collecting fiber 139, $R_v < R_g$. The liquid migrates generally horizontally through the post-filter collecting fiber material strips to the adjacent drain strips. In the drain strips, the liquid moves more vertically under the force of gravity to the lower ends of the drain strips. There, the liquid drips out on the downstream side of the collecting fiber media. Allowing the liquid to drip out of the drain strips helps to avoid oversaturating the fiber channel strips 150, the drain strips 154 or the drain layers 156.

Additional structure, such as the drainage insert 59, drain pad 69 and re-entrainment insert 73 of the fiber bed assembly 19 of the first embodiment may be used in the fiber bed assembly 119 of the second embodiment. Any one or all of these structures may be used. A portion of a drainage insert 159 is shown in FIG. 5 to include a support screen 161 and two mats of drainage material 163 located between the support screen and the inner screen 127. The drainage insert 159 illustrated in FIG. 5 is similar in configuration to the drainage insert 59 shown in FIG. 4.

The present invention provides advantages in the filtration of liquids and soluble solids from gas streams. In one embodiment, a mist eliminator incorporating a fiber bed assembly of the present invention can be operated at higher gas stream velocities and at greater aerosol loads than in the past. For example, the mist eliminator can be operated at velocities greater than about 50 feet per minute where the liquid aerosol loading of the gas stream is greater than about 100 mg/ft$^3$. It is believed that reduction in emissions of mist and wetted soluble solids are greatly reduced. In particular the efficiency in removing submicron particles in the gas stream in the primary collection media is improved because the collection media is kept drier by better drainage and pre-filtering of larger particles. The drier collection media is better able to capture submicron particles through the mechanism of Brownian diffusion. Pre-filtering and/or improved drainage prevents or delays the onset of a flooded condition in the fiber bed so that re-entrainment through bubbling, spitting, jetting or fragmentation is avoided. Moreover, the use of a drainage insert, drain pad and re-entrainment insert lessens the effect of a flooded condition by capturing liquid and soluble solids coming off of the discharge face of the drainage layers. Still further, these improvements are achieved with little additional pressure drop across the fiber bed assembly so that less energy (and therefore less cost) is required to operate the mist eliminator. The foregoing advantages are realized without creating multiple joints that must be carefully sealed to avoid gas bypassing. Other embodiments of the present invention may have different advantages or include only some subset of the aforementioned advantages.

Having described the invention in detail, it will be apparent that modifications and variations are possible without departing from the scope or spirit of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "up", "down", "inner", "outer" and other orientational terms is made for convenience, but does not require any particular orientation of the components.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A fiber bed assembly for a fiber bed mist eliminator used to remove aerosols and/or wetted soluble solids from a moving gas stream, the fiber bed assembly comprising:
    a fiber bed support having a wall defining an upstream space and a downstream space, the wall including openings therein to permit the gas stream to move generally freely through the wall from the upstream space to the downstream space;
    a fiber bed supported by the fiber bed support and generally covering the wall openings so that the gas stream passes through the fiber bed moving from the upstream space to the downstream space, the fiber bed comprising collecting fiber media and drainage media located on a downstream side of the fiber media, the drainage media comprising channel strips along the height of the fiber bed, the channel strips being arranged to define overlapping regions in which one of the channel strips overlaps an adjacent one of the channel strips.

2. A fiber bed assembly as set forth in claim 1 wherein the drainage media further comprises drainage layers located generally on a downstream side of the channel strips.

3. A fiber bed assembly as set forth in claim 2 wherein the drainage layers extend substantially the full height of the fiber bed.

4. A fiber bed assembly as set forth in claim 1 wherein the drainage media comprises drain strips, portions of the drain strips being disposed in the overlapping regions between the channel strips.

5. A fiber bed assembly as set forth in claim 4 wherein lower ends of at least some of the channel strips are arranged over portions of the drain strips whereby liquid draining from the channel strips is received into the drain strips.

6. A fiber bed assembly as set forth in claim 5 wherein the drainage media comprises at least one drainage layer extending substantially the full height of the fiber bed, and wherein portions of the drain strips engage the drainage layer.

7. A fiber bed assembly as set forth in claim 4 wherein there are multiple drain strips having portions disposed in the overlapping region between adjacent channel strips.

8. A fiber bed assembly as set forth in claim 7 wherein the channel strips are made of a material that has a residual saturation against gas phase drag of the liquid phase ($R_v$) less than its residual saturation against gravity drainage of the liquid phase ($R_g$).

9. A fiber bed assembly as set forth in claim 8, wherein $R_v$ of the channel strips is about the same as $R_v$ of the collecting fiber media.

10. A fiber bed assembly as set forth in claim 8 wherein the drain strips have $R_v$ that is greater than $R_g$.

11. A fiber bed assembly as set forth in claim 8 wherein the channel strips comprise a thin needle-punched fiber mat made of fibers having a mean diameter of about 3-20 microns formed to a substantially uniform bed voidage of from about 85 to 98 percent.

12. A fiber bed assembly as set forth in claim 1 further comprising a veil located generally on a downstream side of the collecting fiber media generally at a bottom thereof, the veil being adapted to block gas flow therepast, and a drain pad located on a downstream side of the veil for use in draining liquid from the fiber bed at the bottom.

13. A fiber bed assembly as set forth in claim 12 wherein the veil is located generally on a downstream side of the drainage media.

14. A fiber bed assembly as set forth in claim 12 further comprising a re-entrained liquid collection member located in the downstream space.

15. A fiber bed assembly as set forth in claim 14 wherein the re-entrained liquid collection member comprises a mesh pad.

16. A fiber bed assembly as set forth in claim 15 wherein the re-entrained liquid collection member further comprises a baffle plate device located generally downstream of the mesh pad.

17. A fiber bed assembly as set forth in claim 14 wherein the re-entrained liquid collection member comprises a baffle plate device.

18. A fiber bed assembly as set forth in claim 12 wherein the fiber bed is generally tubular in shape having upper and lower ends, and wherein the downstream space is at least partially located in an interior of the tubular fiber bed, the fiber bed assembly further comprising a re-entrained liquid collection member located in the downstream space on the interior of the tubular fiber bed between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

19. A fiber bed assembly as set forth in claim 18 wherein the re-entrained liquid collection member is generally disk-shaped and separates a lower portion of the downstream space in the interior of the tubular fiber member from an upper portion of the downstream face in the interior of the tubular fiber bed.

20. A fiber bed assembly as set forth in claim 18 further comprising a drainage insert located downstream of the fiber bed, the drainage insert extending less than the full height of the fiber bed.

21. A fiber bed assembly as set forth in claim 20 wherein the drainage insert comprises at least one drainage insert layer and a support for holding the drainage insert layer.

22. A fiber bed assembly as set forth in claim 12 further comprising a drainage insert located downstream of the fiber bed.

23. A fiber bed assembly as set forth in claim 1 wherein the fiber bed is generally tubular in shape having upper and lower ends, and wherein the downstream space is at least partially located in an interior of the tubular fiber bed, the fiber bed assembly further comprising a re-entrained liquid collection member located in the downstream space on the interior of the tubular fiber bed between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

24. A fiber bed assembly for a fiber bed mist eliminator used to remove aerosols and/or wetted soluble solids from a moving gas stream, the fiber bed assembly comprising:
a fiber bed support having a wall defining an upstream space and a downstream space, the wall including openings therein to permit the gas stream to move generally freely through the wall from the upstream space to the downstream space;
a fiber bed supported by the fiber bed support and generally covering the wall openings so that the gas stream passes through the fiber bed moving from the upstream space to the downstream space, the fiber bed comprising a collecting fiber media and a pre-filter media on an upstream side of the collecting fiber media, the pre-filter media including a layer of collecting fiber media and drainage media disposed generally between the collecting fiber media and the collecting fiber layer, the collecting fiber layer being formed by strips of collecting fiber material, the drainage media being exposed between adjacent strips for draining liquid collected by the collecting fiber material strips to an upstream side of the fiber bed.

25. A fiber bed assembly as set forth in claim 24 wherein the collecting fiber material strips are arranged to define overlapping regions in which one of the collecting fiber material strips overlaps an adjacent one of the collecting fiber material strips.

26. A fiber bed assembly as set forth in claim 25 wherein the drainage media comprises drain strips, portions of the drain strips being disposed in the overlapping regions between the collecting fiber material strips.

27. A fiber bed assembly as set forth in claim 26 wherein lower ends of the drain strips are located in the overlapping regions of adjacent collecting fiber material strips and are exposed to an upstream side of the fiber bed.

28. A fiber bed assembly as set forth in claim 27 wherein the fiber bed further comprises a post-filter media disposed generally on a downstream side of the collecting fiber media.

29. A fiber bed assembly as set forth in claim 28 wherein the post-filter media comprises a collecting fiber mat adjacent to the collecting fiber media and drainage media located generally opposite the collecting fiber mat from the collecting fiber media.

30. A fiber bed assembly as set forth in claim 29 wherein the collecting fiber mat comprises strips of collecting fiber material arranged along a height of the fiber bed to define overlapping regions.

31. A fiber bed assembly as set forth in claim 30 wherein the post-filter drainage media comprises post-filter drain strips, portions of the post-filter drain strips being disposed in the overlapping regions between adjacent collecting fiber material strips.

32. A fiber bed assembly as set forth in claim 31 wherein the portions disposed in the overlapping regions are upper portions of the post-filter drain strips.

33. A fiber bed assembly as set forth in claim 31 wherein the fiber bed is generally tubular in shape having upper and lower ends, and wherein the downstream space is at least partially located in an interior of the tubular fiber bed, the fiber bed assembly further comprising a re-entrained liquid collection member located in the downstream space on the interior of the tubular fiber bed between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

34. A fiber bed assembly as set forth in claim 33 wherein the re-entrained liquid collection member is generally disk-shaped and separates a lower portion of the downstream space in the interior of the tubular fiber member from an upper portion of the downstream space in the interior of the tubular fiber bed.

35. A fiber bed assembly as set forth in claim 33 further comprising a drainage insert located downstream of the fiber bed.

36. A fiber bed assembly as set forth in claim 35 wherein the drainage insert comprises at least one drainage insert layer and a support for holding the drainage insert layer.

37. A fiber bed assembly as set forth in claim 24 further comprising a drainage insert located downstream of the fiber bed.

38. A fiber bed assembly as set forth in claim 24 wherein the fiber bed further comprises a post-filter media disposed generally on a downstream side of the collecting fiber media.

39. A fiber bed assembly for a fiber bed mist eliminator used to remove aerosols and/or wetted soluble solids from a moving gas stream, the fiber bed assembly comprising:
a fiber bed support having a wall defining an upstream space and a downstream space, the wall including openings therein to permit the gas stream to move generally freely through the wall from the upstream space to the downstream space;
a fiber bed supported by the fiber bed support and generally covering the wall openings so that the gas stream passes through the fiber bed moving from the upstream space to the downstream space, the fiber bed being generally tubular in shape having upper and lower ends, the downstream space being at least partially located in an interior of the tubular fiber bed, the fiber bed comprising a collecting fiber media and a pre-filter media on an upstream side of the collecting fiber media, the pre-filter media including a layer of collecting fiber media and drainage media disposed generally between the collecting fiber media and the collecting fiber layer, the fiber bed assembly further comprising a re-entrained liquid collection member located in the downstream space on the interior of the tubular fiber bed between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

40. A fiber bed assembly for a fiber bed mist eliminator used to remove aerosols and/or wetted soluble solids from a moving gas stream, the fiber bed assembly comprising:
a fiber bed support having a wall defining an upstream space and a downstream space, the wall including openings therein to permit the gas stream to move generally freely through the wall from the upstream space to the downstream space;
a fiber bed supported by the fiber bed support and generally covering the wall openings so that the gas stream passes through the fiber bed moving from the upstream space to the downstream space, the fiber bed comprising collecting fiber media and drainage media located on a downstream side of the collecting fiber media, the fiber bed being generally tubular in shape having upper and lower ends, and wherein the downstream space is at least partially located in an interior of the tubular fiber bed;
a re-entrained liquid collection member located at least partially in the downstream space on the interior of the tubular fiber bed and extending in a direction generally transverse to the fiber bed support wall so that the gas stream passes through the re-entrained liquid collection member from the interior space in a direction generally non-parallel to the direction the gas stream passes through the fiber bed.

41. A fiber bed assembly as set forth in claim 40 wherein the re-entrained liquid collection member is located between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

42. A fiber bed assembly as set forth in claim 41 wherein the re-entrained liquid collection member is generally disk-shaped and separates a lower portion of the downstream space in the interior of the tubular fiber member from an upper portion of the downstream space in the interior of the tubular fiber bed.

43. A fiber bed assembly as set forth in claim 40 wherein the re-entrained liquid collection member is located within the tubular fiber bed at a location where gas stream velocity in use will be less than about 700 feet per minute.

44. A fiber bed assembly as set forth in claim 43 wherein, the re-entrained liquid collection member is located within the tubular fiber bed at a location where gas stream velocity in use will be between about 400 and 700 feet per minute.

45. A fiber bed assembly as set forth in claim 40 wherein the re-entrained liquid collection member comprises at least one of a mesh pad and a baffle plate device.

46. A fiber bed assembly as set forth in claim 45 wherein the re-entrained liquid collection member comprises both the mesh pad and the baffle plate device.

47. A fiber bed assembly as set forth in claim 46 wherein the mesh pad is located where the gas stream velocity will be less than about 700 feet per minute in use and the baffle plate device is located where the gas stream velocity will be less than about 1,500 feet per minute.

48. A fiber bed assembly as set forth in claim 40 wherein the re-entrained liquid collection member is located where gas stream velocity in use will be less than about 1,500 feet per minute.

49. A fiber bed assembly as set forth in claim 48 wherein, the re-entrained liquid collection member is located where gas stream velocity in use will be between about 900 and 1,500 feet per minute.

50. A fiber bed assembly for a fiber bed mist eliminator used to remove aerosols and/or wetted soluble solids from a moving gas stream, the fiber bed assembly comprising:
a fiber bed support having a wall defining an upstream space and a downstream space, the wall including openings therein to permit the gas stream to move generally freely through the wall from the upstream space to the downstream space;
a fiber bed supported by the fiber bed support and generally covering the wall openings so that the gas stream passes through the fiber bed moving from the upstream space to the downstream space, the fiber bed comprising collecting fiber media and drainage media located on a downstream side of the fiber media, the drainage media comprising drain strips along the height of the fiber bed, the drain strips being arranged to define overlapping regions in which one of the drain strips overlaps an adjacent one of the drain strips.

51. A fiber bed assembly as set forth in claim 50 wherein the drainage media further comprises drainage layers located generally on a downstream side of the drain strips.

52. A fiber bed assembly as set forth in claim 51 wherein the drainage layers extend substantially the full height of the fiber bed.

53. A fiber bed assembly as set forth in claim 50 wherein the drainage media comprises channel strips, portions of the channel strips being disposed in the overlapping regions between the drain strips.

54. A fiber bed assembly as set forth in claim 53 wherein lower ends of at least some of the channel strips are arranged over portions of the drain strips whereby liquid draining from the channel strips is received into the drain strips.

55. A fiber bed assembly as set forth in claim 54 wherein the drainage media comprises at least one drainage layer extending substantially the full height of the fiber bed, and wherein portions of the drain strips engage the drainage layer.

56. A fiber bed assembly as set forth in claim 50 further comprising a veil located generally on a downstream side of the collecting fiber media generally at a bottom thereof, the veil being adapted to block gas flow therepast, and a drain pad located on a downstream side of the veil for use in draining liquid from the fiber bed at the bottom.

57. A fiber bed assembly as set forth in claim 56 wherein the veil is located generally on a downstream side of the drainage media.

58. A fiber bed assembly as set forth in claim 56 further comprising a re-entrained liquid collection member located in the downstream space.

59. A fiber bed assembly as set forth in claim 58 wherein the re-entrained liquid collection member comprises a mesh pad.

60. A fiber bed assembly as set forth in claim 59 wherein the re-entrained liquid collection member further comprises a baffle plate device located generally downstream of the mesh pad.

61. A fiber bed assembly as set forth in claim 58 wherein the re-entrained liquid collection member comprises a baffle plate device.

62. A fiber bed assembly as set forth in claim 56 wherein the fiber bed is generally tubular in shape having upper and lower ends, and wherein the downstream space is at least partially located in an interior of the tubular fiber bed, the fiber bed assembly further comprising a re-entrained liquid collection member located in the downstream space on the interior of the tubular fiber bed between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

63. A fiber bed assembly as set forth in claim 62 wherein the re-entrained liquid collection member is generally disk-shaped and separates a lower portion of the downstream spaced in the interior of the tubular fiber member from an upper portion of the downstream face in the interior of the tubular fiber bed.

64. A fiber bed assembly as set forth in claim 62 further comprising a drainage insert located downstream of the fiber bed, the drainage insert extending less than the full height of the fiber bed.

65. A fiber bed assembly as set forth in claim 64 wherein the drainage insert comprises at least one drainage insert layer and a support for holding the drainage insert layer.

66. A fiber bed assembly as set forth in claim 56 further comprising a drainage insert located downstream of the fiber bed.

67. A fiber bed assembly as set forth in claim 50 wherein the fiber bed is generally tubular in shape having upper and lower ends, and wherein the downstream space is at least partially located in an interior of the tubular fiber bed, the fiber bed assembly further comprising a re-entrained liquid collection member located in the downstream space on the interior of the tubular fiber bed between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

68. A fiber bed assembly for a fiber bed mist eliminator used to remove aerosols and/or wetted soluble solids from a moving gas stream, the fiber bed assembly comprising:
 a fiber bed support having a wall defining an upstream space and a downstream space, the wall including openings therein to permit the gas stream to move generally freely through the wall from the upstream space to the downstream space;
 a fiber bed supported by the fiber bed support and generally covering the wall openings so that the gas stream passes through the fiber bed moving from the upstream space to the downstream space, the fiber bed comprising collecting fiber media and drainage media located on a downstream side of the collecting fiber media, the fiber bed being generally tubular in shape having upper and lower ends, and wherein the downstream space is at least partially located in an interior of the tubular fiber bed;
 a re-entrained liquid collection member located at least partially in the downstream space on the interior of the tubular fiber bed and between the upper and lower ends of the tubular fiber bed so that some portion of the gas stream passing through the fiber bed to the downstream space subsequently passes through the re-entrained liquid collection member and some portion of the gas stream passing through the fiber bed to the downstream space never passes through the re-entrained liquid collection member.

69. A fiber bed assembly as set forth in claim 68 wherein the re-entrained liquid collection member is generally disk-shaped and separates a lower portion of the downstream space in the interior of the tubular fiber member from an upper portion of the downstream space in the interior of the tubular fiber bed.

70. A fiber bed assembly for a fiber bed mist eliminator used to remove aerosols and/or wetted soluble solids from a moving gas stream, the fiber bed assembly comprising:
 a fiber bed support having a wall defining an upstream space and a downstream space, the wall including openings therein to permit the gas stream to move generally freely through the wall from the upstream space to the downstream space;
 a fiber bed supported by the fiber bed support and generally covering the wall openings so that the gas stream passes through the fiber bed moving from the upstream space to the downstream space, the fiber bed comprising collecting fiber media and drainage media located on a downstream side of the collecting fiber media, the fiber bed being generally tubular in shape having upper and lower ends, and wherein the downstream space is at least partially located in an interior of the tubular fiber bed;
 a re-entrained liquid collection member comprising at least one of a mesh pad and a baffle plate device and located at least partially in the downstream space on the interior of the tubular fiber bed.

71. A fiber bed assembly as set forth in claim 70 wherein the re-entrained liquid collection member comprises both the mesh pad and the baffle plate device.

72. A fiber bed assembly as set forth in claim 71 wherein the mesh pad is located where the gas stream velocity will be less than about 700 feet per minute in use and the baffle plate device is located where the gas stream velocity will be less than about 1,500 feet per minute.

* * * * *